United States Patent [19]

McNinch, Jr.

[11] Patent Number: 5,095,269
[45] Date of Patent: Mar. 10, 1992

[54] SPEED SENSOR FAULT DETECTION SYSTEM AND METHOD

[75] Inventor: Joseph H. McNinch, Jr., Livonia, Mich.

[73] Assignee: Eaton Corporation, Cleveland, Ohio

[21] Appl. No.: 528,521

[22] Filed: May 25, 1990

[51] Int. Cl.$^5$ .............................................. G01P 3/481
[52] U.S. Cl. .................................................. 324/166
[58] Field of Search ................. 324/160, 161, 166, 173, 324/174, 185, 207.25, 239; 303/6.01, 21, 94, 106; 310/155, 108

[56] References Cited

U.S. PATENT DOCUMENTS

| | | | |
|---|---|---|---|
| Re. 305,522 | 2/1981 | Gee et al. | 310/168 |
| 3,920,284 | 9/1975 | Lane et al. | 303/21 |
| 3,929,382 | 12/1975 | McNinch, Jr. et al. | 303/21 |
| 3,961,215 | 6/1976 | Gee et al. | 310/168 |
| 4,152,655 | 5/1979 | Przybyla et al. | 324/239 X |
| 4,168,866 | 9/1979 | McNinch, Jr. et al. | 303/106 |
| 4,669,046 | 5/1987 | Kubo | 303/92 X |
| 4,768,840 | 9/1988 | Sullivan et al. | 303/6.01 |
| 4,818,035 | 4/1989 | McNinch Jr. | 303/7 |
| 4,835,467 | 5/1989 | Gokhale | 324/174 X |
| 4,862,025 | 8/1989 | Dierker, Jr. et al. | 310/68 |
| 4,862,028 | 8/1989 | Dierker, Jr. et al. | 310/168 |
| 4,863,221 | 9/1989 | McNinch et al. | 303/94 |
| 4,893,075 | 1/1990 | Dierker, Jr. | 324/174 |
| 4,924,420 | 5/1990 | Hadley et al. | 324/160 X |

*Primary Examiner*—Kenneth A. Wieder
*Assistant Examiner*—Warren S. Edmonds
*Attorney, Agent, or Firm*—H. D. Gordon

[57] ABSTRACT

The control method/system for sensing "tooth or pulse drop-out" type faults in the output signals from a rotational speed sensor assembly (10) of the type utilizing a rotor (12) and a relatively fixed sensor (16) to provide an output comprising a plurality of pulses having a frequency indicative of the rotational speed of the rotor is provided.

7 Claims, 2 Drawing Sheets

SPEED SENSOR FAULT DETECTION SYSTEM AND METHOD

BACKGROUND OF THE INVENTION

1. Field of the Invention

The present invention relates to a system/method for detecting faults in the output signals from rotational speed sensors. In particular, the present invention relates to a system/method for detecting faults, particularly "tooth drop-out" type faults, in rotational speed sensors of the type comprising a relatively rotatable toothed rotor which rotates past a rotationally fixed sensor or stator member.

2. Description of the Prior Art

Rotational speed sensors which utilize a relatively rotatable toothed rotor which rotates past a relatively fixed sensor or the like are well known in the prior art. Examples of such speed sensor assemblies may be seen by reference to U.S. Pat. Nos. RE 30,522; 3,961,215; 4,862,025; 4,862,028 and 4,893,075, the disclosures of which are hereby incorporated herein by reference. Such rotational speed sensors are often used in connection with automated vehicular components/systems such as automatic fuel controls, automated transmission systems and/or vehicular anti-lock brake systems (ABS).

Typically, such rotational speed sensor assemblies are electromagnetic in nature and rely on the alignment of rotor teeth or spaces between rotor teeth rotating past a sensor to complete or break, respectively, a magnetic flux path to produce a digital or analog signal indicative of the rotational speed of the rotor.

While systems utilizing such rotational speed sensors are well known and widely used, they are not totally satisfactory as misalignments, jolts, damaged rotors or other causes may cause one or more tooth or pulse per measuring cycle not to be properly counted, i.e. "tooth drop-out". When this occurs, a false reading can be generated, usually indicating a much lower than actual speed and/or much greater than actual deceleration rate, which false reading if not detected can result in the automated system operating in an undesirable manner.

SUMMARY OF THE INVENTION

In accordance with the present invention, the drawbacks of the prior art have been minimized or overcome by the provision of a fault sensing technique for detecting if a "missed" or "dropped tooth" speed sensor reading has occurred and, if sensed, for going into a "fail safe" or a "fail soft" logic routine.

The above is accomplished by calculating the currently indicated rotational speed by the relationship $$S = \text{a function of } (N-1)K/(C_N - C_0)$$

where:
 $N$ = number of tooth counts or pulses per fixed duration time loop (0.010 sec. for example);
 $K$ = a constant;
 $C_N$ = time of last N count; and
 $C_0$ = time of first N count.

If the current change in S, or $dS/dt$, is greater than a predetermined reference value (REF) selected to represent the greatest expected wheel deceleration, such as $-25$ G to $-30$ G for example, then a single or multiple "tooth drop-out" error is sensed and the system will either shut off ("fail safe") or go into a fault tolerant ("fail soft") mode of operation.

The time duration of the loop is selected so that a false reading of $(N-1)$ by a single unit will either not effect the calculated value of S or will be detectable (i.e. will cause $dS/dt$ to exceed the reference value REF). Preferably, the fault check logic is preformed prior to any filtering of the sensor input signal.

Accordingly, it is an object of the present invention to provide a control system/method for detecting "tooth drop-out" type errors in a tooth count type toothed rotor/fixed sensor rotational speed sensor.

This and other objects and advantages of the present invention will become apparent from a reading of the description of the preferred embodiment taken in connection with the attached drawings.

DESCRIPTION OF THE PREFERRED EMBODIMENT

Figure 1:
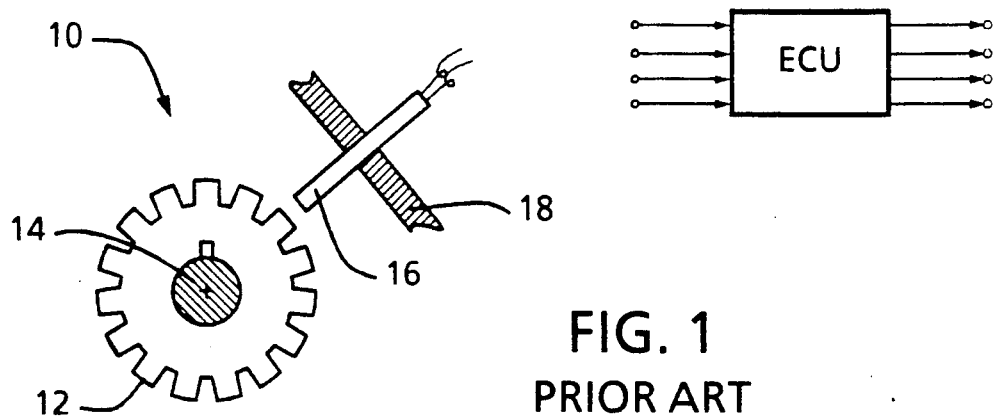
FIG. 1 is a schematic illustration of a toothed rotor type speed sensor assembly.

The control system/control method of the present invention is intended for use in connection with rotational speed sensor assemblies of the type typically utilized to provide input signals to the controllers (CPUs) of vehicular automated drivetrain and/or braking systems. Typically, the greatest possible acceleration and/or deceleration of such wheels is a known value.

Vehicular ABS and automated drivetrain systems are well known in the prior art and examples thereof may be seen by reference to U.S. Pat. Nos. 3,920,284; 3,929,382; 4,168,866; 4,478,840; 4,818,035; 4,863,221; 4,361,060; 4,527,447; 4,643,048 and 4,860,861, the disclosures of all of which are hereby incorporated herein by reference.

Speed sensor assemblies for providing input signals to control units, usually microprocessor based central processing units, are well known in the prior art as may be seen by reference to above-mentioned U.S. Pat. Nos. RE 30522; 3,961,215; 4,862,025; 4,862,028 and 4,893,075. Typically, as may be seen by reference to FIG. 1, such speed sensor assemblies 10 include a toothed ferromagnetic rotor 12 which is keyed to a monitored shaft 14 for rotation therewith and a stator or sensor member 16 rotationally fixed relative to a vehicle component 18 for providing signals indicative of the rotational speed of the rotor. Usually, rotation of one tooth and one tooth space past the stator or sensor 16 will result in the making and then breaking of a magnetic flux path which will result in pulses of increasing and decreasing induced current, the frequency of such pulses or tooth counts being indicative of the rotational speed of the rotor and those members rotating therewith. Of course, the rotor teeth may be replaced by undulations, apertures, etc.

While the present invention is particularly well suited for use with toothed rotor type electromagnetic speed sensor assemblies of the type schematically illustrated in FIG. 1, the present invention is equally applicable to any type of speed sensor assembly providing an output in the form of pulses the frequency of which is indicative of the rotational speed of the monitored members.

Figure 2:
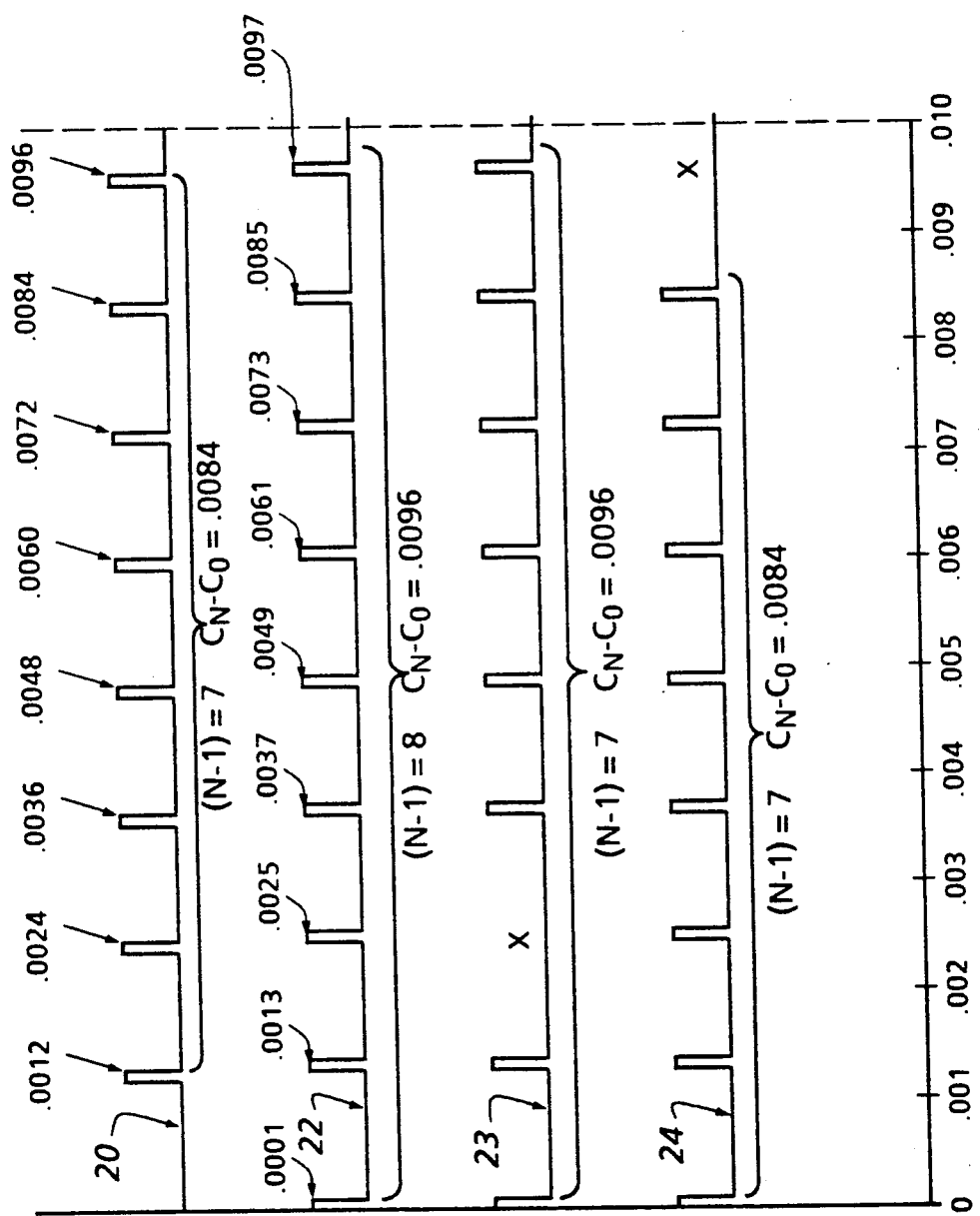
FIG. 2 is a graphical illustration of the output signals from a typical prior art rotational speed sensor.

FIG. 2 is a graphical illustration of the output of a typical pulse type speed sensor assembly and of the use of said pulses to calculate a rotational speed of the monitored shaft 14. As has been indicated above, the basic relationship or formula for calculating the rotational speed of a monitored member such as shaft 14 is $S=(N-1)K/(C_N-C_0)$ where: N=number of teeth counts per fixed duration time loop (0.010 second for example); K=a constant; $C_N$=time of last N count; and $C_0$=time of first N count. The constant K depends upon the number of teeth on the rotor (60 tooth and 100 tooth rotors are typical in ABS systems), gear ratios, tire sizes and the like. In the 60 tooth rotor example illustrated in FIG. 2, K=860 cycles per second (HZ) at 100 mph vehicle speed.

Assuming the cycle time of 10/1,000th of a second (0.010 second), line traces 20 and 22 illustrate proper operation of the sensor assembly 10. At 100 mph vehicle speed, with a constant equal to 860 HZ at 100 mph vehicle speed, a tooth pulse should be generated by the sensor assembly every 0.0012 second (1/860). In trace line 20, the first pulse will be received exactly 0.0012 seconds after the start of the first cycle and thus, assuming substantially constant vehicle speed, eight (8) tooth pulses will be counted during the testing cycle. Accordingly, (N−1) will equal seven (7) and $C_N-C_0$ will equal 0.0012-0.0096, will equal 0.0084 or one pulse every 0.0012 seconds, which corresponds to the calibration of 860 pulses per second equaling 100 mph. Similarly, referring to trace 22 where the first pulse is received at 0.001 second into the cycle, nine (9) pulses will be received during the 0.010 second measurement cycle, (N−1) will equal eight (8), $C_N-C_0$ will equal 0.0096 seconds and once again an average pulse frequency of 0.0012 seconds is observed corresponding to the 100 mph at 860 hz calibration.

Referring to trace 23, assuming vehicle speed has remained at a substantially constant 100 mph and that the toothed pulse which should have been sensed at 0.0025 seconds into the measurement cycle has "dropped out", the CPU will calculate a (N−1)=seven (7) with a $C_N-C_0$ equaling 0.0096. This will result in a pulse being received on average once every 0.00137 seconds or a frequency of about 729.93 HZ which would correspond to about a vehicle velocity of 84.9 miles per hour. This translates into a wheel deceleration of about 15.1 mph in 0.010 second which would correspond to a wheel deceleration of approximately −60 g which is clearly in excess of expected wheel deceleration.

In practice, in typical vehicular use, any wheel acceleration exceeding a reference value of approximately −25 or −30 g may be considered indicative of an error. In trace line 24, assuming a substantially constant 100 mph vehicle speed, and a "drop-out" of the tooth pulse which should have been received at approximately 0.0097 seconds of the test cycle, (N−1) will equal seven (7), and $C_N-C_0$ will equal 0.0084 resulting in a frequency of tooth pulse of one every 0.0012 second which, while not allowing sensing of a tooth drop-out problem, will result in an accurate indication of vehicular speed. Typically, in a situation such as this, the tooth drop-out will eventually occur other than at the very beginning or the very end of the testing cycle and will allow fault detection thereof.

At 50 MPH vehicle speed, assuming conditions similar to those in the example of trace 20 above, i.e. K=860 HZ at 100 MPH vehicle speed and a cycle time of 0.010 second, a tooth pulse should be generated, on average, every 0.0024 second (1/430). Thus N will equal 4, N−1 will equal 3 and $C_N-C_0$ will equal 0.0072 (0.0024−0.0096) which is a pulse every 0.0024 second. If a tooth or pulse is "dropped", N−1 will equal 2, which indicates a pulse every 0.0036 second or a vehicle deceleration of about 75 G which will, of course, exceed the reference REF.

In the case of a 100 tooth rotor, K will equal 1,400 KZ at 100 MPH vehicle speed (700 KZ at 50 MPH vehicle speed) and a dropped tooth pulse will result in an apparent vehicle acceleration of about −35 g at true 100 MPH and about −38 g at true 50 MPH vehicle speeds, both of which will exceed the selected reference.

It is noted that the apparent vehicle acceleration resulting from a "dropped tooth" is generally constant for a given rotor over a large range of true vehicle speeds.

Upon sensing of a tooth drop-out fault, the system will, preferably, indicate the existence of a fault to the vehicle operator and will take appropriate action in the form of either fail safe or fail soft logic. In a fail safe logic situation, the automated system utilizing the sensor assembly 10 will simply discontinue operation which may render the vehicle inoperative. In a fail soft situation, usually associated with non-vehicle safety related equipment, a fault tolerance logic will be utilized. Typically, in for example a transmission system, if the failed sensor is an engine speed sensor the logic may utilize transmission input shaft speed as a substitute therefor. Fault tolerance logic of this nature may be seen by reference to U.S. Pat. No. 4,849,899, the disclosure of which is hereby incorporated by reference.

It is, of course, important to select the cycle time which is short enough such that, in the range of expected speeds, a reading of (N−1) which is at least one less than true value will result in a value for the change in S or dS/dt exceeding the predetermined reference value (REF). It is also important that the tooth drop-out fault testing occur prior to any filtering of the input signals from speed sensor assembly 10.

Figure 3:
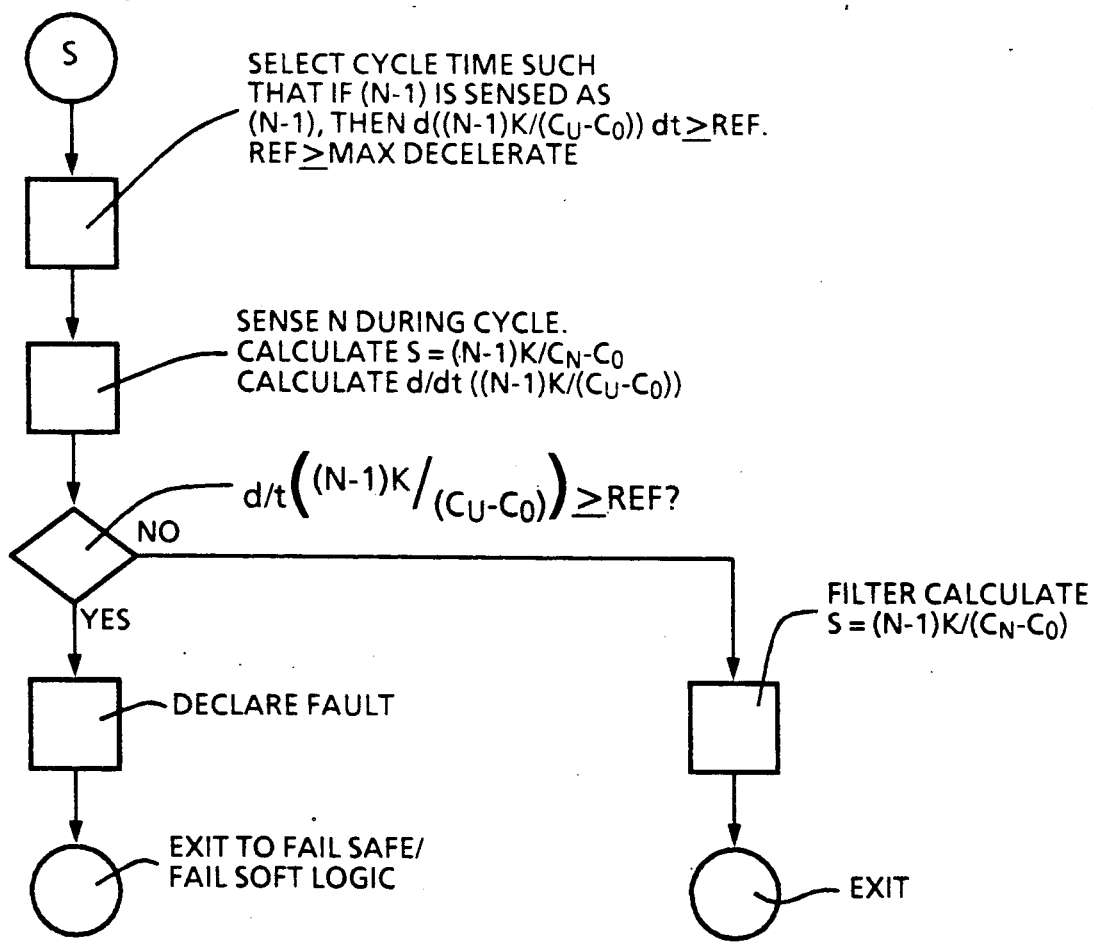
FIG. 3 is a schematic illustration, in flow chart format, of the control system/method of the present invention.

A schematic illustration, in flow chart format, of the control system/method of the present invention may be seen by reference to FIG. 3. As discussed above, a cycle time is selected such that if the true value of N−1 is misread as N−2 or less, then the change or first time derivative of calculated vehicle speed will exceed the predetermined reference value. Preferably, the predetermined reference value is about −20 to −30 g which exceeds the maximum vehicle deceleration rate expected in vehicular applications. During each cycle the number N of tooth counts is sensed and the value of change or the first time derivative of $d((N-1)K/(C_N-C_0))/dt$ is calculated and compared to the reference value. If the change or time derivative, which is representative of vehicle acceleration/deceleration, does not indicate a tooth drop-out fault in the output signal from the sensor assembly 10, the output of the sensor assembly is filtered and then utilized to calculate the vehicular speed by formula $S=(N-1)K/C_N-C_0$. If however a toothed drop-out problem is detected, a fault is declared and the system will then default to a fail safe or fail soft logic routine.

Accordingly, it may be seen that a reliable control system/method has been provided for detecting "dropped tooth" type faults in the output signals from toothed rotor type rotational speed sensors.

Although the present invention has been defined with a certain degree of particularity, it is understood that the preferred embodiment has been described by way of example only in the numerous modifications and rearrangements are possible without departing from the spirit and the scope of the invention is hereinafter claimed.

I claim:

1. A method for detecting and reacting to "dropped pulse type" faults in the output signals from speed sensor assemblies (10) in a control system including a control unit (ECU) for processing input signals according to either a non-fault sensed set of predetermined logic rules and a separate fault sensed (fail safe, fail soft) set of predetermined logic rules and a speed sensor assembly of the type comprising a rotor (12) rotatably associated with the monitored rotatable member (14) and a relatively fixed sensor member (16), said sensor assembly providing an output signal (20, 22, 24, 26) comprising a plurality of pulses having a frequency indicative of the rotational speed (S) of said rotor, the rotational speed determined as a function of the number (N) of said pulses over a period of time, said method characterized by:

selecting the period of time such that if the actual value of $(N-1)$ is sensed as equalizing $(N-2)$ or less, then a determined absolute value of the rate of change in S will be greater than a reference value equal to at least a largest expected deceleration rate of the monitored object;

determining a value indicative of the rate of change with respect to time in S;

comparing the absolute value of said value indicative of in the rate of change in S to said reference value (REF); and if the absolute value of the value indicative of the rate of change of S is greater than said reference value, causing said control unit to process input signals according to said fault sensed set of predetermined logic rules.

2. The control method of claim 1 wherein said absolute value of the rate of change in S is determined by a comparison of the current calculated value for S and the last calculated value for S.

3. The control method of claim 1 wherein the calculated value for the rate of change in S is the first derivative of the value of S with respect to time.

4. The control method of claims 1, 2 or 3 wherein said
$(N-1)K/(C_N-C_0)$ where S=rotational speed of the monitored object; N=number of pulse counts per fixed time duration cycle loop; K=a constant; $C_N$=time of last N count; and $C_0$=time of first N count.

5. A control system for detecting and responding to "dropped tooth type" faults in the output signals from tooth rotor type speed sensor assemblies, said control system including a control unit (ECU) for processing input signals according to either a non-fault sensed set of predetermined logic rules and a separate fault sensed (fail safe, fail soft) set of predetermined logic rules and a speed sensor assembly (10) of the type comprising a tooth rotor (12) rotatably associated with the monitored rotatable member (14) and a relatively fixed sensor member (16), said sensor assembly providing an output signal (20, 22, 24, 26) comprising a plurality of pulses having a frequency indicative of the rotational speed of said rotor, the rotational speed determined as a function of the number (N) of said tooth pulses sensed in a time period, said system characterized by:

means for setting the time period such that if the actual value of $(N-1)$ is sensed as equaling $(N-2)$ or less, then a determined absolute value of the rate of change in S will be greater than a reference value equal to at least a largest expected deceleration rate of the monitored object;

means for determining a value indicative of the rate of change with respect to time in S;

means for comparing the absolute value of said value indicative of the rate of change in S to said reference value (REF) and if the absolute value of the value indicative of the rate of change of S is greater than said reference value, causing said control unit to process said input signals according to said fault sensed set of predetermined logic rules.

6. The control system of claim 5 wherein the calculated value for the rate of change in S is the first derivative of the value of S with respect to time.

7. The control system of claims 5, or 6 wherein said function is defined by the relationship S is a function of $(N-1)K/(C_N-C_0)$ where S=rotational speed of the monitored object; N=number of tooth pulse counts per fixed time duration cycle loop; K=a constant; $C_N$=time of last N count; and $C_0$=time of first N count.

* * * * *